Oct. 1, 1957 T. J. REESE 2,808,272
CAR LEVEL AND LOAD ADJUSTING DEVICE
Filed May 11, 1955 3 Sheets-Sheet 1
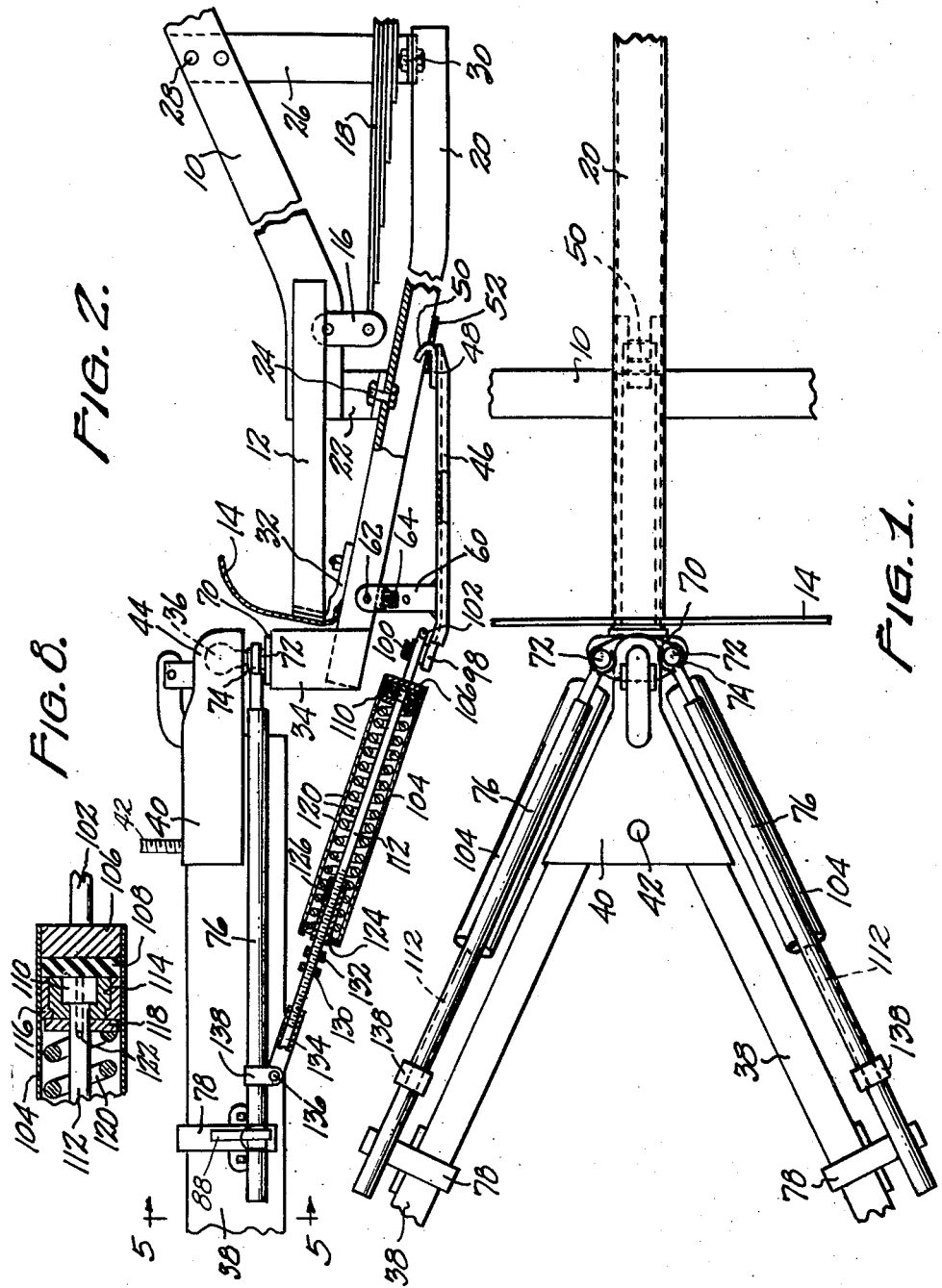
INVENTOR.
TERRELL J. REESE
BY
Eugene C. Knoblock
ATTORNEY.

Oct. 1, 1957 T. J. REESE 2,808,272
CAR LEVEL AND LOAD ADJUSTING DEVICE
Filed May 11, 1955 3 Sheets-Sheet 2
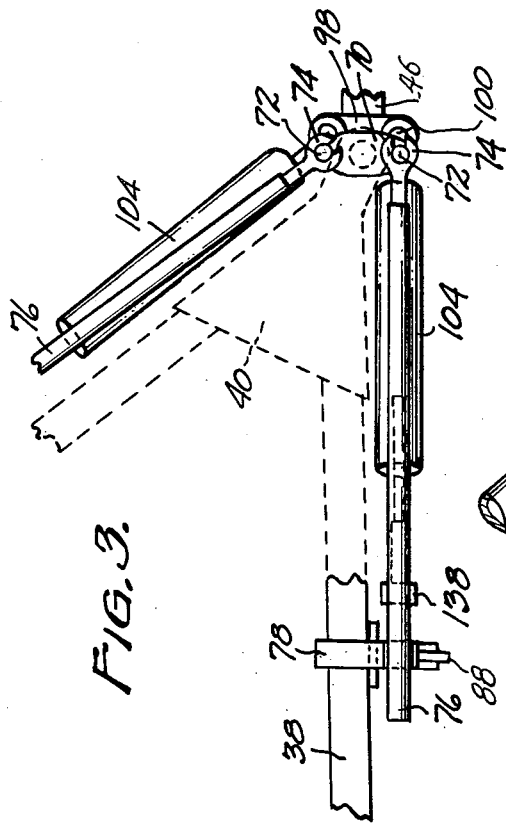
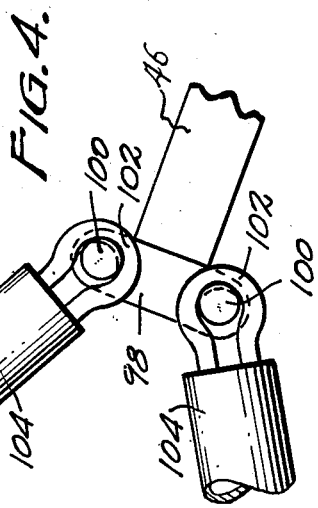
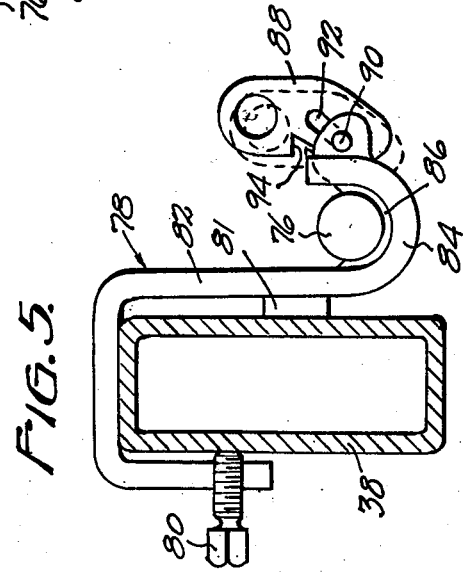
INVENTOR.
TERRELL J. REESE
BY
Eugene C. Knoblock
ATTORNEY.

Oct. 1, 1957 T. J. REESE 2,808,272
CAR LEVEL AND LOAD ADJUSTING DEVICE
Filed May 11, 1955 3 Sheets-Sheet 3
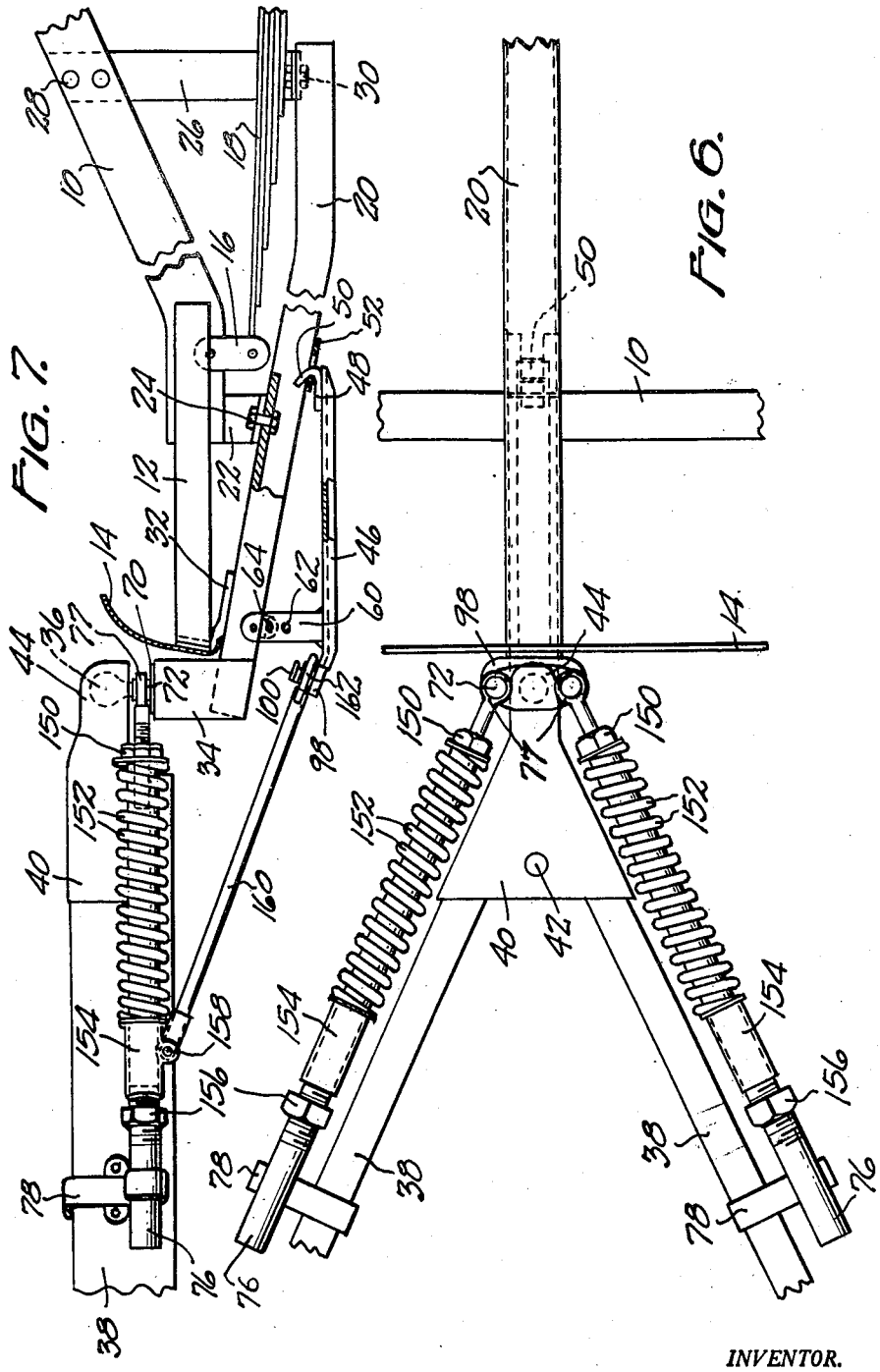
INVENTOR.
TERRELL J. REESE
BY
Eugene C. Knoblock
ATTORNEY.

United States Patent Office 2,808,272
Patented Oct. 1, 1957

2,808,272
CAR LEVEL AND LOAD ADJUSTING DEVICE

Terrell J. Reese, Elkhart, Ind.

Application May 11, 1955, Serial No. 507,560

11 Claims. (Cl. 280—406)

This invention relates to a car level device, and more particularly to a device of this character in the nature of a trailer hitch functioning to connect a trailer to a tractive vehicle and to transmit a part of the load from a trailing vehicle to the front wheels of a tractive vehicle so as to distribute the weight transmitted by the trailer to the tractive vehicle between the front and rear wheels of the tractive vehicle.

This invention is an improvement upon a device forming the subject matter of my co-pending patent application for trailer hitch, Ser. No. 308,744, filed September 10, 1952, now Patent No. 2,729,467, and incorporates substantially all of the advantages of the device of said patent application.

Among the objects of this device are: to regulate the transfer of load from a trailing vehicle to the frame of a tractive vehicle; to provide a free loading spring and adjustable means for maintaining a desired amount of tension on that spring when the device is operated to hitch a trailing vehicle to a tractive vehicle and when disconnected; to permit ready attachment and detachment of the tractive and trailing vehicles and ready mounting of the parts of the device upon a tractive vehicle in an inconspicuous position and in a releasable manner; and to provide a device of this character which is strong, light in weight, rapidly and simply assembled, and which can be conveniently connected and disconnected.

A further object is to provide a device of this character with means to retard lateral movement of a trailing vehicle relative to a tractive vehicle, so as to avoid weaving and side swaying or swinging of the trailing vehicle.

A further object is to provide a device of this character having a pair of springs so positioned therein with relation to means for preventing side sway of the trailing vehicle during normal travel as to permit variation in tension on said spring in opposite directions incident to the turning of a corner so that there is substantially no tendency on the part of the springs to introduce side thrust or sway on the tractive vehicle when turning a corner.

Other objects will be apparent from the following specification.

In the drawings:

Fig. 1 is a top plan view of the hitch and associated parts of the tractive and trailing vehicles;

Fig. 2 is a side view of the hitch in assembled or connected position with respect to the tractive and trailing vehicles and with parts thereof shown in section;

Fig. 3 is a fragmentary top plan view of the hitch illustrating the relation of the parts when the tractor-trailer combination turns a corner;

Fig. 4 is an enlarged fragmentary plan view illustrating a portion only of the device in normal position;

Fig. 5 is a sectional detail view taken on line 5—5 of Fig. 2;

Fig. 6 is a top plan view of a modified embodiment of the invention;

Fig. 7 is a side view of the hitch embodiment shown in Fig. 6 illustrating the same in assembled or connected position with respect to tractive and trailing vehicles and with parts thereof shown in section; and Fig. 8 is an enlarged detail sectional view of the cylinder unit.

Referring to the drawings, and particularly to Figs. 1 to 5, inclusive, which illustrate one embodiment of the invention, the numeral 10 designates a part of the frame or chassis of an automobile, and particularly designates longitudinal chassis members. Bumper brackets 12 are carried by the rear of the chassis frame 10 and serve to mount a conventional rear bumper 14. The frame 10 also pivotally mounts spring shackles 16 by means of which vehicle springs 18 are mounted in the conventional manner.

The vehicle chassis has fixedly secured thereto a rigid hitch carrier. This hitch carrier preferably comprises an elongated longitudinally extending member 20 which is preferably an inverted channel member, but which may be a structural member of any desired configuration to provide strength and insure rigidity thereof. The carrier member 20 is positioned longitudinally and centrally of frame 10 and is mounted intermediate its ends at the rear of the chassis or frame 10 by means of a rigid bracket 22 welded or otherwise fixedly secured to and depending from frame 10 and bolted or otherwise secured to the member 20 to 24. The front end portion of the carrier member 20 is secured to frame 10 by means of a rigid bracket 26 fixedly secured at its upper end to the chassis 10 at 28 spaced forwardly of the bracket 22 and preferably forwardly of the spring chackles 16 but rearwardly of the rear axle (not shown). Bolts 30 interconnect the lower end of the bracket 26 and the front end portion of the elongated carrier member 20.

The carrier member 20 is preferably of a length to extend rearwardly beyond the bumper 14 and, if desired, may mount a bracket 32 adapted for hooked supporting engagement with the bumper 14. At its rear end the carrier member 20 fixedly mounts a rigid upright member 34 which carries a kingpin 36 at its upper end. The kingpin is preferably located at a level adjacent the level of the upper portion of the bumper 14. As best seen in Fig. 2, the carrier member 20 is preferably inclined upwardly and rearwardly for at least a part of its length.

The trailing vehicle will include the usual forwardly projecting rigid frame members or projections 38, which converge forwardly of the trailer body and are secured together at their forward ends by a rigid front plate or bracket 40 which commonly provides means for mounting a jackscrew 42. The member 40 may form part of a detachable hitch unit of conventional character having a forward socket portion 44 fitting around and bearing upon the kingpin 36 to provide a swivel joint. The construction of the socket 44 may be of any standard or conventional type, and hence will not be described herein.

A rigid elongated brace member 46, which may constitute an inverted channel or any other desired structural element, is adapted to be secured to the carrier member 20 to extend in rearwardly diverging relation therebelow. The forward end of the brace member has means for detachably connecting the same with the carrier member 20. As here shown, the shank portion 48 of the hook is fixedly secured to the brace member 46 by welding or other means. The hook includes an upwardly extending return bent portion 50. The carrier member 20 has a part 52, such as a cross-plate, welded or otherwise fixedly secured thereto intermediate the mounting brackets 22 and 26 therefor, which is adapted to be engaged by the hook 48, 50, as at an aperture in said plate. The part 52 is rigid and preferably is engaged by the hook 50 in a manner to prevent lateral movement of the hook relative to the part 52.

The carrier member 20 also mounts bracket means located adjacent the rear end of the carrier. A yoke 60 has a part thereof welded or otherwise secured to the top of the brace member 46 and projects upwardly therefrom. Preferably a pair of laterally spaced arms are provided whose spacing is greater than the width of the carrier 20. The arms of yoke 60 have a plurality of vertically spaced apertures 62 formed therein. A securing member 64, such as a bolt, extends through the member 20 or through a part secured thereto and through a selected set of the apertures 62, and is provided with means for locking it in selected position. Thus the member 64 may constitute a bolt and nut, or a pin with a transverse bore receiving a cotterpin or the like. The arrangement is such that the longitudinal attitude or tilt relation of the brace member 46 relative to the rear inclined portion of the carrier member 20 may be adjusted as desired to vary the spacing between the rear end of the brace member 46 and the rear end of the carrier 20. It will be apparent that the hook 48, 50 will control the longitudinal position of the brace 46 while permitting the rear part of the brace to be adjusted vertically relative to the carrier.

A transverse plate 70 is fixedly and non-rotatively mounted in a horizontal position upon the upper end of the rigid upright portion 34 of the carrier 20. The plate 70 has a pair of pins or studs 72 secured thereto in equispaced relation to the kingpin 36 on opposite sides thereof. These studs may be fixed in selected position transversely of the member 34 by any suitable means, such as by welding thereof to the plate 70 and carrier portion 34. Hence studs 72 are mounted in fixed relation to the carrier 20 and the auto chassis 10. Each of the anchor studs 72 is preferably circumferentially grooved eccentrically thereof to receive the forked end portion 74 of an elongated rigid friction arm 76. Bracket members 78 are secured to the trailer tongue members 38 in substantially equispaced relation to the kingpin to engage the respective arms 76. Brackets 78 may be of a construction as illustrated in Fig. 5. Thus the member 78 may comprise a substantially U-shaped inverted member adapted to fit over and embrace the trailer tongue member 38 and to be anchored detachably and adjustably thereto by means of set screw or set screws 80, and an opposite abutment 81 on leg 82 of bracket 78. The leg 82 of the channel bracket 78 is positioned alongside the outer surface of the tongue member 38 and has an outwardly projecting socket member or abutment 84 of substantially semi-circular or arcuate shape as shown, to whose upper concave face is secured friction material 86, such as brake lining material. A clip member 88 may be pivotally secured to pivot pin 90 carried by the outer end of the member 84 and has an elongated slot 92 therein receiving the pivot pin 90. A notch 94 is preferably formed in the inner edge of the member 88 and is adapted to seat against the adjacent socket member 84 when the pivot pin 90 is located in the upper end of the slot 92, so as to constitute a vertical extension of the member or releasable means to prevent lateral displacement of the rear end portion of the rigid friction arm 76 from the socket member 84. The member 88 is so positioned and shaped that it may pivot outwardly and downwardly relative to the socket member 84 when in the full line position in Fig. 5, with the pin 90 seated in the lower end of its slot 92, thereby facilitating free movement of the rigid arm 76 relative to the socket member 84 during assembly and disassembly.

As best illustrated in Fig. 4, the rear end of the base member 46 fixedly mounts a cross-member 98. Studs 100 are fixedly secured upon the cross-member 98 in laterally spaced relation, and each is preferably provided with an eccentric or cam groove extending therearound. Loop or eyelet members 102 each having an inner diameter slightly greater than the diameter of the anchor studs 100 fit around and seat in the eccentric groove as illustrated in Fig. 4. The loop members or eyes 102 are mounted upon the forward ends of cylinders 104, as at end plates 106. A rubber bumper or washer 108 is mounted within the cylinder 104 adjacent end member 106 and is adapted to be abutted by a nut 110 screw-threaded on the end of a shaft 112. The nut 110 cooperates with a reduced or shouldered end portion of the shaft 112 to mount and fixedly secure a spreader member 114 for a cup leather 116 serving to seal the lower end of the cylinder and held in place by a washer 118 against which presses one end of an elongated coil spring 120 encircling the shaft 112. The shaft 112 is provided with a bleeder port and passage 122 opening laterally at a point inwardly of the washer 118, as illustrated in Fig. 2, and extending to an opening at the end of said shaft adjacent to the bumper washer 108.

At its opposite end the cylinder 104 is closed by an end plate or disk 124 having an elongated central tubular portion 126 slidable upon the shaft 112. An internal circumferential groove 128 is formed in the tube 126 and receives an annular sealing member which encircles the shaft 112 to form a fluid-tight seal between the shaft and the tube. The shaft 112 projects from the end of the cylinder 104 shown at the left in Fig. 2 and has mounted thereon stop members, such as nuts 130 and 132. The stop 132 adjacent the tube 126 is preferably screw-threaded and adjustable on the shaft 112, and the stop 130 is preferably welded or otherwise fixed on said shaft. The projecting end portion of the shaft 112 is screw-threaded and has an adjustable screw-threaded fit in tubular socket member 134 which is pivotally connected at 136 to a bracket member 138 secured upon the friction arm 76 adjacent the rear end thereof near the bracket member 78, and preferably forwardly of member 78, as here shown.

In the use of the hitch, assuming that the parts have been connected together as illustrated in Figs. 1 and 2, it will be observed that the action of the swivel coupling 36, 44 interconnecting the tractive and trailing vehicles is supplemented by the leveling unit extending divergently rearwardly relative to the coupling 36, 44 and spaced therebelow. The leveling unit includes the substantially Y-shaped multiple part brace made up of the parts 46, 104 and 112 which urges arms 76 into sockets or abutments 84. The relatively shiftable parts 104, 112 are extensible against the action of spring 120 and are cushioned by oil or other liquid contained within the cylinder 104. Liquid displaced from the spring chamber upon extension of the device is free to flow past the cup leather seal 116 into the end of the cylinder. Return flow of liquid is metered by the passage 122.

The front part 46 of the leveling unit is anchored in selected relation to the rigid carrier member 20 by virtue of the longitudinal spacing of the connections between parts 46 and 20 at 50 and 64. Likewise, because of the longitudinal spacing of the connections at 22, 26 and 32 between the carrier member 20 and the vehicle chassis 10, the member 46 is fixedly anchored relative to the vehicle chassis. The pull exerted by the springs 120 is transmitted by cylinders 104, eyelets 102 and members 46, 60 and 20 to the chassis 10. Thus the leveling device provides tensioned braces exerting an upward acting thrust at 60 intermediate its ends on the connected ends of the vehicles and the swivel coupling 36, 40 therebetween. The amount of tension exerted by the springs 120 is easily regulated by adjustment of the screw-threaded connection of the shaft 112 within the socket member 134. Road shock tending to elongate the tensioned braces and thereby lower the connected ends of the vehicles is followed by rebound action of springs 120, but this rebound action is damped by the restricted flow of liquid in passage 122, there being no flow past the cup leather 116 from right to left, as viewed in Fig. 8.

Inasmuch as the carrier member 20 is fixedly connected to the chassis at longitudinally spaced points thereof, and inasmuch as the brace member 46 is longitudinally connected at spaced points to the carrier member 20, the exertion of rearward pull upon the brace 46 by springs 120 to lift the rear end of the chassis 10 produces a downward forward tilting action upon the tractive vehicle. This insures that some of the weight of the trailing vehicle which is normally transferred at the hitch to the rear of the tractive vehicle will be applied by the leveling device to the front axle of the tractive vehicle. Thus it is possible, by adjusting the location of the abutments 132 or shaft 112 so as to limit the extension of the leveling device or by adjusting the position of the shaft 112 relative to the socket 134, to regulate the attitude of the tractive vehicle when connected to a trailer and also to accommodate connection of trailers applying different weights to a trailer hitch. Thus by a simple adjustment of the leveling device the user may vary the riding properties and attitude of the tractive and trailing vehicles.

The device is easily applied or connected to an automobile by means of the carrier member 20 and associated parts which may be maintained on the automobile as a permanent part thereof, if desired. The brace member 46 may also be permanently mounted on the vehicle, if desired. However, the brace 46 will usually be removed when the trailer is disconnected from the tractive vehicle, and the disconnection of the brace 46 is accomplished simply by the removal of a securing member 64 to free the brace 46 for longitudinal movement to disengage the hook 50 from the member 52.

A trailer is connected to a tractive vehicle by first positioning the two adjacent each other, with the front of the trailer supported at an elevation above the kingpin 36 by its jack 42. The stop member 132 will have been threaded into engagement with the end of the sleeve 126 to maintain the desired compression of the spring 120. Then the shaft 112 is extended in the socket 134 to elongate the overall dimension between the pivot point 136 and the hook 50 as compared to normal dimension. This facilitates engagement of the hook with the plate 52, connection of the member 60 with the carrier 20 by the securing member 64, connection of the loop 102 of each cylinder 104 with an anchor stud 100, and engagement of friction arms 76 with brackets 78, 84. The interconnection of the swivel coupling 36, 44 is then effected by lowering the screw jack 42 and manipulating the coupling. Thereupon the stop 132 is shifted to desired adjustment, and the shaft 112 is readjusted in the socket 134 to shorten the overall length of the unit to operative length.

It will be apparent that the spring 120 pulls upon the brace parts 104, 102 and 46 to place them in tension at all times when the trailer hitch is operative to connect a tractive and a trailing vehicle. This constitutes a substantial advantage in the device by way of minimizing the cross-sectional size and the weight of the brace parts and the hitch. Consequently, excessive load conditions are not experienced.

The relation of the position of the center of the swivel coupling 36, 44 to the pivots 100, 102, with the latter located spaced below and slightly forwardly and laterally outwardly from the pivot center of the coupling 36, 44 is of advantage in the device in that it accommodates release of the tension of one of the springs 120 during turning of the tractor-trailer combination. This release of spring tension avoids stress on the tractor in a direction which might tend to tip the tractor laterally. Release of spring tension occurs at the member connected to pin 72 displaced from coupling 36, 44 in the direction of the turn, and increased spring tension occurs at the other member because the position of the trailer carried tensioned last named lower brace assembly forwardly and laterally outwardly relative to the swivel coupling 36, 44 during the turn requires elongation thereof against the resistance of spring 120 to such elongation. The swivel coupling 36, 44 constitutes the actual center of the pivoting of the various parts, however, and the tensioned brace assemblies 104, 112 swing laterally to provide a substantially straight line connection between the brace part 46 and one of the two laterally diverging assemblies 104, 112 to produce a shortening of the same accommodated by the action of the spring 120. Simultaneously the other assembly 104, 112 is positioned at a greater angle to the longitudinal axis of the tractive vehicle, and is lengthened against the action of spring 120.

It will be observed that the tension exerted by the springs 120 which would normally be adjusted to be substantially equal, acts against the rear end portions of the rigid friction arms 76 in a direction to press the same firmly against the friction material 86 carried by the bracket 78. Note that the arms 76 extend forwardly in converging relation with their bifurcated ends pressed against the laterally spaced anchor studs 72 at opposite ends of the kingpin 36. This arrangement of parts serves to retard sliding of the elongated friction arms 76 relative to the hitch tongue 38 incident to turning of the tractor-trailer assembly and thereby causes the trailer to follow truly behind the tractive vehicle. In other words, this combination and arrangement of parts serves to resist side swinging or lateral weaving of the trailer, and thereby stabilizes the tractor-trailer combination so as to eliminate dangerous driving conditions frequently encountered with tractor-trailer combinations connected by conventional or prior hitch structures.

The use of the dual spring tensioned brace unit 104, 112, 120 permits one unit thereof to release tension while the other increases tension incident to turning a corner. Consequently, there is substantially no tendency of the springs 120 to introduce side thrust or sway on the tractive vehicle when turning a corner. This results in more perfect following the tractor by the trailer, with ease of driving, better control of the tractor-trailer combination and ease of operation. These factors also make possible travel with safety at higher speeds than have heretofore been possible with tractor-trailer combinations whose connecting hitches were of conventional character. High speed tractor-trailer operation with the device above described is made possible by the combination of the features of laterally stabilized trailer movement, true following of the tractor by the trailer on turning, and a leveling action to apply trailer weight to the front wheels of the tractive vehicle so that the longitudinal attitude of the chassis of the tractive vehicle may remain substantially normal during use.

A modified and simplified and less expensive construction having substantially the same advantages as the construction above described is illustrated in Figs. 6 and 7, wherein parts similar to those of the above described embodiment bear similar numbers. In this case the elongated rigid friction arms 76 have looped forward ends 77 which fit around the anchor studs 72 carried by the plate 70 on the upper end of the part 34 of the carrier member 20, which is anchored to the auto chassis 10 in the same manner above described. A nut 150 is screw-threaded on each friction arm 76 adjacent to the loop 77 and to the swivel joint 36, 44 between the tractive and trailing vehicles. The rear end of each of the rigid friction arms 76 is engaged with a rigid friction bracket 78 carried by the trailer tongue unit 38, as previously described. An elongated coil spring 152 encircles each rigid friction arm 76 and bears at its forward end against the nut 150. A sleeve 154 is slidable upon each rigid friction arm 76 and a stop 156, such as an adjustable nut, limits the sliding movement of the sleeve 154 on the rigid friction arm 76. The sleeve 154 preferably has a depending projection to which is pivoted at 158 the rear upper end of one of two rigid elongated arms 160 each having an eyelet end 162 engageable with one of the two laterally spaced studs 100 mounted on part 98 at the rear end of brace member 46 positioned below the carrier 20 and detachably mounted in fixed position thereon.

It will be observed that the action in this instance is one in which coil springs 152 serve to exert a rearward upward force upon the brace members 160 and 46 in a manner to apply an upward thrust at 60 to the members 20 and the rear of the vehicle chassis and to thereby transmit a part of the load of the trailer to the front wheels of the tractor. In other words, the springs 152 serve the previously described function of assisting in holding the tractive vehicle at substantially level or horizontal position. The adjustability of the stops 150 accommodates adjustment of the force of the spring applied to this device, and the adjustable stops 156 limit expansion of the springs and the stroke or movement of members 160. The springs 152 also act in such a manner as to resist relative sliding of the arms 76 with respect to the friction material coated bracket members 78 carried by the trailer tongue unit 38. This embodiment of the invention also acts to avoid lateral swinging and swaying of the trailer. The use of the two springs 152 associated with the members 76 whose forward ends are spaced apart and positioned transversely spaced from the true pivot axis 36, 44 of the hitch between the tractive and trailing vehicles, permits true following of the tractor by the trailing vehicle when a turn is made. In other words, one of the springs 152 is compressed and the other is released when a turn is made, and the arrangement avoids side thrust or sway upon the tractive vehicle incident to making such a turn.

While the preferred embodiments of the invention have been illustrated and described herein, it will be understood that changes in the construction may be made within the scope of the appended claims without departing from the spirit of the invention.

I claim:

1. A device for detachably connecting a tractor and a trailer, comprising a two-part detachable swivel hitch having a king-pin, a pair of rearwardly diverging rigid friction arms anchored to said tractor adjacent to but spaced laterally of said king-pin and adapted to bear against abutments on said trailer, and a leveling unit including a multiple part brace connected at its rear to intermediate portions of said arms and adapted to be connected at its front to said tractor at longitudinally spaced points forward of and below said king-pin, and spring means cooperating with said friction arms and brace to frictionally press said arms against said trailer abutments.

2. A device for detachably connecting a tractor and a trailer, comprising a two-part detachable swivel hitch having a king-pin, a pair of rearwardly diverging rigid friction arms anchored to said tractor adjacent to but spaced laterally of said king-pin and adapted to engage abutments on said trailer, and a leveling unit including a multiple-part brace connected at its rear to intermediate portions of said arms and adapted to be connected at its front to said tractor at longitudinally spaced points forward of and below said king-pin, and spring means cooperating with said friction arms and brace to frictionally press said arms against said trailer abutments, said multiple-part brace being extensible and said spring means resisting extension thereof.

3. A device for detachably connecting a tractor and a trailer, comprising a two-part detachable swivel hitch including a king-pin, a pair of rearwardly diverging rigid friction arms anchored to said tractor adjacent to but laterally of said king-pin and adapted to engage abutments on said trailer, and a leveling unit including a multiple-part brace connected at its rear to intermediate portions of said arms and adapted to be connected at its front to said tractor at longitudinally spaced points forward of and below said king-pin, and spring means cooperating with said friction arms and brace to frictionally press said arms against said trailer abutments, said brace including a front part having means for fixedly securing it to said tractor at said longitudinally spaced points and a pair of laterally rearwardly and upwardly diverging parts secured in laterally spaced relation to said front part and each connected to a friction arm.

4. A device for detachably connecting a tractor and a trailer, comprising a two-part detachable swivel hitch including a king-pin, a pair of rearwardly diverging rigid friction arms anchored to said tractor adjacent to but laterally of said king-pin and adapted to engage sockets on said trailer, a leveling unit including a multiple-part brace connected at its rear to intermediate portions of said arms and adapted to be connected at its front to said tractor at longitudinally spaced points forward of and below said king-pin, and spring means cooperating with said arms and brace to frictionally press said arms against said trailer sockets, said brace including a front part having means for fixedly securing it to said tractor at said longitudinally spaced points, and a pair of laterally rearwardly and upwardly diverging parts secured in laterally spaced relation to said front part and each connected to a friction arm, said diverging brace parts being formed of cooperating relatively slidable parts carrying abutments, and said spring means cooperating with said relatively slidable parts between the abutments thereof to resist extension.

5. A device for detachably connecting a tractor and a trailer, comprising a two-part detachable swivel hitch including a king-pin, a pair of rearwardly diverging rigid friction arms anchored to said tractor adjacent to but laterally of said king-pin and adapted to engage abutments on said trailer, a multiple-part brace connected at its rear to intermediate portions of said arms and adapted to be connected at its front to said tractor at longitudinally spaced points forward of and below said king-pin, and spring means cooperating with said arms and brace to frictionally press said arms against said trailer abutments, said brace including a front part having means for fixedly securing it to said tractor at said longitudinally spaced points and a pair of laterally rearwardly and upwardly diverging parts secured in laterally spaced relation to said front part, said spring means constituting a coil spring encircling each friction arm, a member slidable rearwardly on each friction arm by said coil spring, said diverging brace parts being connected to said slidable members.

6. A device for detachably connecting a tractor and a trailer, comprising a two-part detachable swivel hitch including a king-pin, a pair of rearwardly diverging rigid friction arms anchored to said tractor adjacent to but laterally of said king-pin and adapted to engage abutments on said trailer, a leveling unit including a multiple-part brace connected at its rear to intermediate portions of said arms and at its front to said tractor at longitudinally spaced points forward of and below said king-pin, and spring means cooperating with said arms and brace to frictionally press said arms against said trailer abutments, said abutments constituting friction members carried by said trailer and engaged by said friction arms.

7. A device for interconnecting tractive and trailing vehicles connected by a pivoted hitch having a king-pin, comprising a pair of bars, means carried by said tractive vehicle for pivoting the front ends of said bars on vertical axes spaced laterally of said king-pin, laterally spaced abutments on said trailing vehicle each engaged by a bar, a pair of laterally spaced braces connected to said tractive vehicle forwardly of and below said king-pin and extending rearwardly and upwardly to said bars, and spring means for pressing said arms against said abutments to laterally stabilize said trailing vehicle.

8. A device for interconnecting tractive and trailer vehicles connected by a pivoted hitch having a king-pin, comprising a pair of bars, means carried by said tractive vehicle for pivoting the front ends of said bars on vertical axes spaced laterally of said king-pin, laterally spaced abutments on said trailing vehicle each engaged by a bar, a pair of laterally spaced braces connected to said tractive vehicle forwardly of and below said king-pin and extending rearwardly and upwardly to said bars adjacent said abutments, and spring means for pressing said arms against said abutments to laterally stabilize said trailing vehicle, said braces each including a pair of parts relatively shiftable endwise between predetermined extended and retracted limits, said spring means urging said shiftable brace bars toward retracted position.

9. A device for interconnecting tractive and trailer vehicles connected by a pivoted hitch having a king-pin, comprising a pair of bars, means carried by said tractive vehicle for pivoting the front ends of said bars on vertical axes spaced laterally of said king-pin, laterally spaced abutments on said trailing vehicle each engaged by a bar, a pair of laterally spaced braces connected to said tractive vehicle forwardly of and below said king-pin and extending rearwardly and upwardly to said bars forwardly of said abutments, and spring means for pressing said arms against said abutments to laterally stabilize said trailing vehicle, each brace including a cylinder and a piston, said spring means being confined in said cylinder and urging said piston toward selected brace tensioning position in said cylinder.

10. A device for interconnecting tractive and trailer vehicles connected by a pivoted hitch having a king-pin, comprising a pair of bars, means carried by said tractive vehicle for pivoting said bars on vertical axes spaced laterally of said king-pin, laterally spaced abutments on said trailing vehicle each engaged by a bar, a pair of laterally spaced braces connected to said tractive vehicle forwardly of and below said king-pin and extending rearwardly and upwardly to said bars, and spring means for pressing said bars against said abutments to laterally stabilize said trailing vehicle, each brace including a cylinder and a piston, said spring means being confined in said cylinder and urging said cylinder toward selected brace tensioning position in said cylinder, said piston containing liquid and said piston accommodating flow of liquid therepast at a faster rate in one direction than the other direction.

11. A device for interconnecting tractive and trailer vehicles connected by a pivoted hitch having a king-pin, comprising a pair of bars, means carried by said tractive vehicle for pivoting said bars on vertical axes spaced laterally of said king-pin, laterally spaced abutments on said trailing vehicle each engaged by a bar, a pair of laterally spaced braces connected to said tractive vehicle forwardly of and below said king-pin and extending rearwardly and upwardly to said bars, and spring means for pressing said bars against said abutments to laterally stabilize said trailing vehicle, each brace including a cylinder and a piston, said spring means being confined in said cylinder and urging said piston toward selected brace tensioning position in said cylinder, said cylinder having a cushioning abutment engageable by said piston in spring urged direction.

References Cited in the file of this patent
UNITED STATES PATENTS

| | | |
|---|---|---|
| 2,549,814 | Hume | Apr. 24, 1951 |
| 2,597,657 | Mathisen | May 20, 1952 |
| 2,709,604 | Hartman | May 31, 1955 |
| 2,715,034 | Cornwall | Aug. 9, 1955 |